Figure 1:
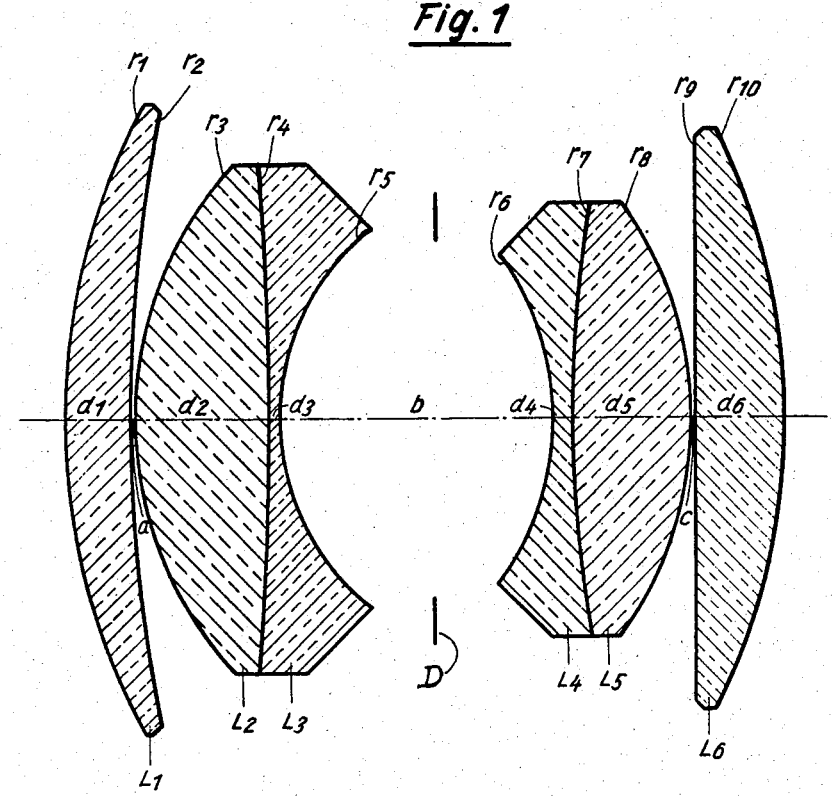

Jan. 15, 1957 J. BERGER ET AL 2,777,362
PHOTOGRAPHIC OBJECTIVE COMPRISING TWO DISPERSIVE MENISCUS
COMPONENTS ENCLOSED BY TWO COLLECTIVE COMPONENTS
Filed March 10, 1954 2 Sheets-Sheet 1

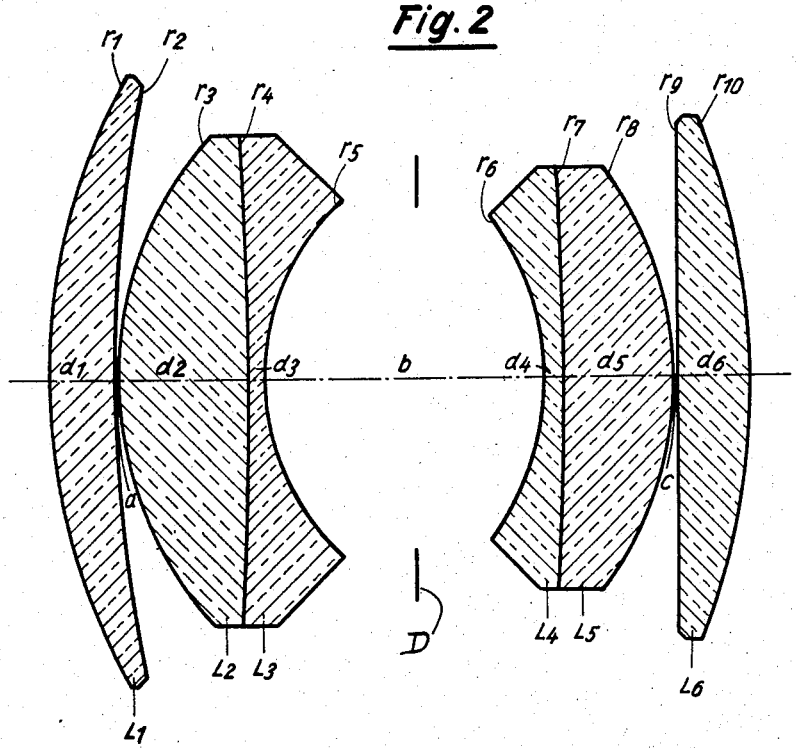

United States Patent Office 2,777,362
Patented Jan. 15, 1957

2,777,362

PHOTOGRAPHIC OBJECTIVE COMPRISING TWO DISPERSIVE MENISCUS COMPONENTS ENCLOSED BY TWO COLLECTIVE COMPONENTS

Johannes Berger, Heidenheim (Brenz), and Günther Lange, Konigsbronn, Germany, assignors to Carl Zeiss, Heidenheim (Brenz), Germany Application March 10, 1954, Serial No. 415,222

Claims priority, application Germany March 17, 1953

5 Claims. (Cl. 88—57)

The present invention concerns photographic objectives, especially such with a relative aperture of 1:4 and greater, with an over-all length greater than 40% of the focal length, consisting of four components, namely of a collective meniscus-shaped front component, two likewise meniscus-shaped divergent components, which surround the diaphragm, whereby the surfaces of these components bounding the diaphragm space turn their concave sides towards one another, and of a collective rear component.

In accordance with the invention an improvement of objectives of this kind of construction is achieved thereby, that the following limitations are simultaneously fulfilled:

$$0.5 \cdot f < D_s < 0.7 \cdot f$$
$$1.4 \bar{r}_s < D_s < 2.0 \bar{r}_s$$
$$0.3 \cdot f < \bar{r}_s < 0.4 \cdot f$$
$$0.24 \cdot f < D_z < 0.35 \cdot f$$
$$1.0 \bar{r}_z < D_z < 1.2 \bar{r}_z$$
$$0.2 \cdot f < \bar{r}_z < 0.3 \cdot f$$
$$0.6 \cdot f < L < 0.8 \cdot f$$
$$0.08 \cdot f < d_{II} < 0.25 \cdot f$$
$$0.08 \cdot f < d_{III} < 0.25 \cdot f$$
$$2.0 \bar{r}_z < D_s < 3.0 \bar{r}_z$$
$$0.9 r_v < |r_h| < 1.2 r_v$$

wherein:

$D_s$=the axial distance between the converging surfaces of the two meniscus dispersive components, and $\bar{r}_s$=the arithmetic mean of the absolute values of the radii of these surfaces, and $D_z$=the vertex distances of the surfaces bounding the diaphragm space, and $r_v$=the radius of the surfaces bounding the diaphragm space on the object side, and $r_h$=the radius of the surfaces bounding the diaphragm space on the image side, and $\bar{r}_z$=the arithmetic mean of the absolute amounts of the radii ($r_v$ and $r_h$) of these surfaces, $L$=the overall length of the objective, and $d_{II}$=the midthickness of the dispersive component arranged at the object side of the diaphragm space, and $d_{III}$=the midthickness of the dispersive component arranged at the image side of the diaphragm space.

Accordingly to a further embodiment of the invention the refractive index or $n$-value of the divergent lens in the divergent meniscus-shaped component following the diaphragm space, either is made greater than the $n$-value of the divergent lens in the divergent meniscus-shaped component in front of the diaphragm space, or greater than the arithmetic mean of the $n$-values of the divergent lens in the divergent meniscus-shaped component in front of the diaphragm space and of the convergent lens in the meniscus-shaped divergent component following the diaphragm.

Through the application of these measures in accordance with the invention a reduction of the spherical overcorrection of the oblique pencils is attained, which was disturbing in older objectives of similar construction. Also in an objective constructed in accordance with the invention, the Petzval sum can be selected relatively small and therewith a good flattening of the image field obtained, without suffering losses in respect to the attainable image angle. In regard to the Petzval sum one obtains, as is known particularly favorable objectives, if one employs in the two collective outer elements, glasses with an $n$-value as high as possible, e. g. of more than 1.64. For the case that one provides a cemented surface in one or both of these outer elements, glasses with an $n$-value as high as possible are employed in the collective elements of these components.

Figures 1 and 2 show two execution forms of objectives in accordance with the invention are represented in section in the accompanying illustrations, while in the tables presented in the following, numerical values are specified for four examples of objectives constructed in accordance with the invention. Thereby Fig. 1 corresponds to the exeution forms in accordance with Examples I, II, and III, while Example IV is represented graphically in Fig. 2.

In the illustrations and in the examples are designated with $r$=the radii of the refracting surfaces, with $d$=the thicknesses of the elements, with $a$; $b$; $c$=the axial separation distances between the individual components.

The focal length of the objectives for all examples amounts to $f=100$ units, and the relative aperture 1:2, the available image angle $\pm 24°$.

The amounts of the Petzval sums for all examples presented in the following lie about at $\frac{1}{8} f$. Such values are to be considered as relatively small for objectives with image angles of $\pm 24°$ and a relative aperture of 1:2.

Upon employing the objectives according to the present invention as photographic picture taking objectives by the term "front component" there will be understood the component turned to the object. In case the objective is employed as a projection objective it is true that the opposite counting is obvious, i. e. the component designated as the front component is then traversed by light as the last and therefore in this case this component is the rear one and turned to the projection screen.

*Example I (Fig. 1)*

| Lenses | Radii | Thicknesses and distances | Refractive index $n_d$ | Abbe number $\nu_d$ |
|---|---|---|---|---|
| $L_1$ | $r_1 = + 63.1703$ | $d_1 = 6.505$ | 1.69100 | 54.8 |
| | $r_2 = +147.660$ | $a = 0.191$ | | |
| $L_2$ | $r_3 = + 36.0372$ | $d_2 = 13.105$ | 1.62230 | 53.1 |
| | $r_4 = -255.126$ | | | |
| $L_3$ | | $d_3 = 1.722$ | 1.57501 | 41.3 |
| | $r_5 = + 23.4024$ | $b = 26.976$ | | |
| | $r_6 = - 26.6395$ | | | |
| $L_4$ | | $d_4 = 1.913$ | 1.63980 | 34.6 |
| | $r_7 = +122.465$ | | | |
| $L_5$ | | $d_5 = 11.671$ | 1.61720 | 54.0 |
| | $r_8 = - 35.5226$ | $c = 0.191$ | | |
| | $r_9 = \infty$ | | | |
| $L_6$ | | $d_6 = 9.183$ | 1.71700 | 47.9 |
| | $r_{10} = - 62.2673$ | | | |

Example II (Fig. 1)

| Lenses | Radii | Thicknesses and distances | Refractive index $n_d$ | Abbe number $\nu_d$ |
|---|---|---|---|---|
| $L_1$ | $r_1 = + 63.2269$ | $d_1 = 6.511$ | 1.69100 | 54.8 |
|  | $r_2 = +152.108$ | $a = 0.191$ |  |  |
| $L_2$ | $r_3 = + 36.5942$ | $d_2 = 13.117$ | 1.62230 | 53.1 |
|  | $r_4 = -307.900$ | $d_3 = 1.723$ | 1.57501 | 41.3 |
| $L_3$ | $r_5 = + 23.7623$ | $b = 26.809$ |  |  |
|  | $r_6 = - 27.0483$ |  |  |  |
| $L_4$ |  | $d_4 = 1.915$ | 1.69895 | 30.1 |
|  | $r_7 = +122.574$ | $d_5 = 11.490$ | 1.66755 | 41.9 |
| $L_5$ | $r_8 = - 36.5942$ | $c = 0.191$ |  |  |
|  | $r_9 = \infty$ |  |  |  |
| $L_6$ |  | $d_6 = 7.660$ | 1.71700 | 47.9 |
|  | $r_{10} = - 60.1209$ |  |  |  |

Example III (Fig. 1)

| Lenses | Radii | Thicknesses and distances | Refractive index $n_d$ | Abbe number $\nu_d$ |
|---|---|---|---|---|
| $L_1$ | $r_1 = + 61.3404$ | $d_1 = 6.501$ | 1.69100 | 54.8 |
|  | $r_2 = +139.316$ | $a = 0.191$ |  |  |
| $L_2$ | $r_3 = + 35.501$ | $d_2 = 12.945$ | 1.61272 | 58.6 |
|  | $r_4 = -659.179$ | $d_3 = 1.721$ | 1.56732 | 42.8 |
| $L_3$ | $r_5 = + 23.2199$ | $b = 27.916$ |  |  |
|  | $r_6 = - 26.4322$ |  |  |  |
| $L_4$ |  | $d_4 = 1.912$ | 1.69895 | 30.1 |
|  | $r_7 = +1608.80$ | $d_5 = 10.899$ | 1.70154 | 41.1 |
| $L_5$ | $r_8 = - 34.9943$ | $c = 0.191$ |  |  |
|  | $r_9 = -3760.62$ |  |  |  |
| $L_6$ |  | $d_6 = 6.501$ | 1.69100 | 54.8 |
|  | $r_{10} = - 65.4437$ |  |  |  |

Example IV (Fig. 2)

| Lenses | Radii | Thicknesses and distances | Refractive index $n_d$ | Abbe number $\nu_d$ |
|---|---|---|---|---|
| $L_1$ | $r_1 = + 61.2136$ | $d_1 = 6.488$ | 1.69100 | 54.8 |
|  | $r_2 = +141.042$ | $a_1 = 0.191$ |  |  |
| $L_2$ | $r_3 = + 35.9409$ | $d_2 = 12.918$ | 1.60881 | 58.9 |
|  | $r_4 = -427.165$ | $d_3 = 1.717$ | 1.56732 | 42.8 |
| $L_3$ | $r_5 = + 23.5077$ | $b = 27.858$ |  |  |
|  | $r_6 = - 26.5683$ |  |  |  |
| $L_4$ |  | $d_4 = 1.908$ | 1.67270 | 32.2 |
|  | $r_7 = -354.276$ | $d_5 = 11.067$ | 1.66672 | 48.4 |
| $L_5$ | $r_8 = - 34.4239$ | $c = 0.191$ |  |  |
|  | $r_9 = +1239.08$ |  |  |  |
| $L_6$ |  | $d_6 = 7.060$ | 1.69100 | 54.8 |
|  | $r_{10} = - 69.1799$ |  |  |  |

We claim:

1. A photographic objective lens system comprising two meniscus dispersive components with their concave exterior surfaces facing one another and including between them a diaphragm, said dispersive components being arranged between two collective components, all said components being axially aligned and air separated from each other, the said dispersive components each comprising a collective lens element and a dispersive lens element the collective elements of said dispersive components being arranged between their respective dispersive elements and the adjacent collective components, wherein the average value of the Abbe $\nu$ numbers of the dispersive lens elements of said dispersive components is greater than that of their collective elements, one of the collective components having exterior surfaces of different curvature and being arranged as front component with its more strongly curved surface facing outwards, and the following limitations being simultaneously fulfilled:

$$0.5 \cdot f < D_s < 0.7 \cdot f$$
$$1.4\bar{r}_s < D_s < 2.0\bar{r}_s$$
$$0.3 \cdot f < \bar{r}_s < 0.4 \cdot f$$
$$0.24 \cdot f < D_2 < 0.35 \cdot f$$
$$1.0\bar{r}_s < D_s < 1.2\bar{r}_z$$
$$0.2 \cdot f < \bar{r}_s < 0.3 \cdot f$$
$$0.6 \cdot f < L < 0.8 \cdot f$$
$$0.08 \cdot f < d_{II} < 0.25 \cdot f$$
$$0.08 \cdot f < d_{III} < 0.25 \cdot f$$
$$2.0\bar{r}_s < D_s < 3.0\bar{r}_s$$
$$0.9 r_v < |r_h| < 1.2 r_v$$

wherein:

$D_s$ = the axial distance between the converging surfaces of the two meniscus dispersive components, and $\bar{r}_s$ = the arithmetic mean of the absolute values of the radii of these surfaces, and $D_2$ = the vertex distances of the surfaces bounding the diaphragm space, and $r_v$ = the radius of the surfaces bounding the diaphragm space on the object side, and $r_h$ = the radius of the surfaces bounding the diaphragm space on the image side, and $r_z$ = the arithmetic mean of the absolute amounts of the radii ($r_v$ and $r_h$) of these surfaces, $L$ = the overall length of the objective, and $d_{II}$ = the midthickness of the dispersive component arranged at the object side of the diaphragm space, and $d_{III}$ = the midthickness of the dispersive component arranged at the image side of the diaphragm space, and the mean refractive index of the dispersive lens element in the dispersive component located at the image side of the diaphragm space being greater than the mean refractive index of the dispersive lens element of the dispersive component located at the object side of the diaphragm space, and likewise greater than the arithmetic mean of the refractive indices of the dispersive lens element of the dispersive lens component located at the object side and the collective element of the dispersive component located at the image side of the diaphragm space.

2. A photographic objective lens system, according to claim 1, in which the power of refractions ($\Delta n/r$) deviate each for at the most $\pm 0.5/f$ and the lens thicknesses ($d$) and the air distances ($a$; $b$; $c$) each for at the most $\pm 0.05 \cdot f$ from the numerical data as set forth in the following table:

| Lenses | Radii | Thicknesses and Distances | $n_d$ | $\nu_d$ | $\Delta n/r$ |
|---|---|---|---|---|---|
| $L_1$ | $r_1 = +0.631702 \cdot f$ | $d_1 = 0.06505 \cdot f$ | 1.69100 | 54.8 | $+1.093868/f$ |
|  | $r_2 = +1.476600 \cdot f$ | $a = 0.00191 \cdot f$ |  |  | $-0.467967/f$ |
| $L_2$ | $r_3 = +0.360372 \cdot f$ | $d_2 = 0.13105 \cdot f$ | 1.62230 | 53.1 | $+1.726827/f$ |
|  | $r_4 = -2.551260 \cdot f$ |  |  |  | $+0.018536/f$ |
| $L_3$ | $r_5 = +0.234024 \cdot f$ | $d_3 = 0.01722 \cdot f$ | 1.57501 | 41.3 | $-2.457056/f$ |
|  |  | $b = 0.26976 \cdot f$ |  |  |  |
|  | $r_6 = -0.266395 \cdot f$ |  |  |  | $-2.401697/f$ |
| $L_4$ | $r_7 = +1.224650 \cdot f$ | $d_4 = 0.01913 \cdot f$ | 1.63980 | 34.6 | $-0.018454/f$ |
| $L_5$ | $r_8 = -0.355226 \cdot f$ | $d_5 = 0.11671 \cdot f$ | 1.61720 | 54.0 | $+1.737485/f$ |
|  |  | $c = 0.00191 \cdot f$ |  |  |  |
|  | $r_9 = \infty$ |  |  |  | $\pm 0.00000/f$ |
| $L_6$ | $r_{10} = -0.622673 \cdot f$ | $d_6 = 0.09183 \cdot f$ | 1.71700 | 47.9 | $+1.151487/f$ | where:

$L_1, L_2 \ldots$ are the lens elements
$r_1, r_2 \ldots$ the radii
$d_1, d_2 \ldots$ the thicknesses
$a, b, c$ the air distances
$n_d$ the refractive indices and
$\nu_d$ the Abbe numbers
$f$ is the focal length of the objective.

3. A photographic objective lens system, according to claim 1, in which the power of refractions ($\Delta n/r$) deviate each for at the most $\pm 0.5/f$ and the lens thicknesses ($d$) and the air distances ($a; b; c$) each for at the most $\pm 0.05 \cdot f$ from the numerical data as set forth in the following table:

| Lenses | Radii | Thicknesses and Distances | $n_d$ | $\nu_d$ | $\Delta n/r$ |
|---|---|---|---|---|---|
| $L_1$ | $r_1 = +0.632269 \cdot f$ | $d_1 = 0.06511 \cdot f$ | 1.69100 | 54.8 | $+1.092889/f$ |
|  | $r_2 = +1.521080 \cdot f$ | $a = 0.00191 \cdot f$ |  |  | $-0.454282/f$ |
|  | $r_3 = +0.365942 \cdot f$ |  |  |  | $+1.700543/f$ |
| $L_2$ |  | $d_2 = 0.13117 \cdot f$ | 1.62230 | 53.1 |  |
| $L_3$ | $r_4 = -3.079000 \cdot f$ | $d_3 = 0.01723 \cdot f$ | 1.57501 | 41.3 | $+0.015359/f$ |
|  | $r_5 = +0.237623 \cdot f$ | $b = 0.26809 \cdot f$ |  |  | $-2.419841/f$ |
|  | $r_6 = -0.270483 \cdot f$ |  |  |  | $-2.584081/f$ |
| $L_4$ | $r_7 = +1.225740 \cdot f$ | $d_4 = 0.01915 \cdot f$ | 1.69895 | 30.1 | $-0.025617/f$ |
| $L_5$ | $r_8 = -0.365942 \cdot f$ | $d_5 = 0.11490 \cdot f$ | 1.66755 | 41.9 | $+1.824196/f$ |
|  | $r_9 = \infty$ | $c = 0.00191 \cdot f$ |  |  | $\pm 0.000000/f$ |
| $L_6$ | $r_{10} = -0.601209 \cdot f$ | $d_6 = 0.07660 \cdot f$ | 1.71700 | 47.9 | $+1.192597/f$ | where:
$L_1, L_2 \ldots$ are the lens elements
$r_1, r_2 \ldots$ the radii
$d_1, d_2 \ldots$ the thicknesses
$a, b, c$ the air distances
$n_d$ the refractive indices and
$\nu_d$ the Abbe numbers
$f$ the focal length of the objective.

4. A photographic objective lens system, according to claim 1, in which the power of refractions ($\Delta n/r$) deviate each for at the most $\pm 0.5/f$ and the lens thicknesses ($d$) and the air distances ($a; b; c$) each for at the most $\pm 0.05 \cdot f$ from the numerical data as set forth in the following table:

| Lenses | Radii | Thicknesses and Distances | $n_d$ | $\nu_d$ | $\Delta n/r$ |
|---|---|---|---|---|---|
| $L_1$ | $r_1 = +0.613404 \cdot f$ | $d_1 = 0.06501 \cdot f$ | 1.69100 | 54.8 | $+1.126501/f$ |
|  | $r_2 = +1.393160 \cdot f$ | $a = 0.00191 \cdot f$ |  |  | $-0.495995/f$ |
|  | $r_3 = +0.355010 \cdot f$ |  |  |  | $+1.725923/f$ |
| $L_2$ |  | $d_2 = 0.12945 \cdot f$ | 1.61272 | 58.6 |  |
| $L_3$ | $r_4 = -6.591790 \cdot f$ | $d_3 = 0.01721 \cdot f$ | 1.56732 | 42.8 | $+0.006887/f$ |
|  | $r_5 = +0.232199 \cdot f$ | $b = 0.27916 \cdot f$ |  |  | $-2.443249/f$ |
|  | $r_6 = -0.264322 \cdot f$ |  |  |  | $-2.644313/f$ |
| $L_4$ | $r_7 = +16.088000 \cdot f$ | $d_4 = 0.01912 \cdot f$ | 1.69895 | 30.1 | $+0.000161/f$ |
| $L_5$ | $r_8 = -0.349943 \cdot f$ | $d_5 = 0.10899 \cdot f$ | 1.70154 | 41.1 | $+2.004726/f$ |
|  | $r_9 = -37.606200 \cdot f$ | $c = 0.00191 \cdot f$ |  |  | $-0.018375/f$ |
| $L_6$ | $r_{10} = -0.654437 \cdot f$ | $d_6 = 0.06501 \cdot f$ | 1.69100 | 54.8 | $+1.055869/f$ | where:
$L_1, L_2 \ldots$ are the lens elements
$r_1, r_2 \ldots$ the radii
$d_1, d_2 \ldots$ the thicknesses
$a, b, c$ the air distances
$n_d$ the refractive indices and
$\nu_d$ the Abbe numbers
$f$ the focal length of the objective.

5. A photographic objective lens system, according to claim 1, in which the power of refractions ($\Delta n/r$) deviate each for at the most $\pm 0.5/f$ and the lens thicknesses ($d$) and the air distances ($a; b; c$) each for at the most $\pm 0.05 \cdot f$ from the numerical data as set forth in the following table:

| Lenses | Radii | Thicknesses and Distances | $n_d$ | $\nu_d$ | $\Delta n/r$ |
|---|---|---|---|---|---|
| $L_1$ | $r_1 = +0.612136 \cdot f$ | $d_1 = 0.06488 \cdot f$ | 1.69100 | 54.8 | $+1.128834/f$ |
|  | $r_2 = +1.410420 \cdot f$ | $a = 0.00191 \cdot f$ |  |  | $-0.489925/f$ |
|  | $r_3 = +0.359409 \cdot f$ |  |  |  | $+1.693920/f$ |
| $L_2$ |  | $d_2 = 0.12918 \cdot f$ | 1.60881 | 58.9 |  |
| $L_3$ | $r_4 = -4.271650 \cdot f$ | $d_3 = 0.01717 \cdot f$ | 1.56732 | 42.8 | $+0.009713/f$ |
|  | $r_5 = +0.235077 \cdot f$ | $b = 0.27858 \cdot f$ |  |  | $-2.413337/f$ |
|  | $r_6 = -0.265683 \cdot f$ |  |  |  | $-2.531965/f$ |
| $L_4$ | $r_7 = -3.542760 \cdot f$ | $d_4 = 0.01908 \cdot f$ | 1.67270 | 32.2 | $+0.001688/f$ |
| $L_5$ | $r_8 = -0.344239 \cdot f$ | $d_5 = 0.11067 \cdot f$ | 1.66672 | 48.4 | $+1.936794/f$ |
|  | $r_9 = +12.390800 \cdot f$ | $c = 0.00191 \cdot f$ |  |  | $+0.055767/f$ |
| $L_6$ | $r_{10} = -0.691799 \cdot f$ | $d_6 = 0.07060 \cdot f$ | 1.69100 | 54.8 | $+0.998345 \cdot f$ | where:
$L_1, L_2 \ldots$ are the lens elements
$r_1, r_2 \ldots$ the radii
$d_1, d_2 \ldots$ the thicknesses
$a, b, c$ the air distances
$n_d$ the refractive indices and
$\nu_d$ the Abbe numbers
$f$ the focal length of the objective.

References Cited in the file of this patent

UNITED STATES PATENTS

| 583,336 | Rudolph | May 25, 1897 |
| 1,786,916 | Merte | Dec. 30, 1930 |
| 2,117,252 | Lee | May 10, 1938 |
| 2,391,209 | Warmisham | Dec. 18, 1945 |
| 2,645,975 | Ito | July 21, 1953 |

FOREIGN PATENTS

| 507,590 | Great Britain | June 19, 1939 |